(12) United States Patent
Wayans

(10) Patent No.: US 9,537,901 B2
(45) Date of Patent: Jan. 3, 2017

(54) METHOD AND APPARATUS FOR IMPLEMENTING A BUSINESS CARD APPLICATION

(71) Applicant: Damon Kyle Wayans, Thousand Oaks, CA (US)

(72) Inventor: Damon Kyle Wayans, Thousand Oaks, CA (US)

(*) Notice: Subject to any disclaimer, the term of this patent is extended or adjusted under 35 U.S.C. 154(b) by 234 days.

(21) Appl. No.: 13/777,647

(22) Filed: Feb. 26, 2013

(65) Prior Publication Data

US 2013/0227037 A1    Aug. 29, 2013

Related U.S. Application Data

(60) Provisional application No. 61/603,692, filed on Feb. 27, 2012.

(51) Int. Cl.
*G06F 15/16* (2006.01)
*H04L 29/06* (2006.01)
*H04L 29/08* (2006.01)

(52) U.S. Cl.
CPC ............... *H04L 65/10* (2013.01); *H04L 67/10* (2013.01)

(58) Field of Classification Search
CPC .......... H04L 67/10; H04L 65/10; H04L 67/16; H04L 67/28; H04L 67/04; H04L 67/18; H04L 67/306; H04W 4/02

USPC ......................................................... 709/206
See application file for complete search history.

(56) References Cited

U.S. PATENT DOCUMENTS

| | | | |
|---|---|---|---|
| 2005/0103838 A1* | 5/2005 | Slotkin et al. | 235/380 |
| 2006/0065707 A1* | 3/2006 | Kanatani et al. | 235/375 |
| 2007/0129959 A1 | 6/2007 | Bransky et al. | |
| 2008/0032673 A1 | 2/2008 | Osborn et al. | |
| 2009/0181653 A1* | 7/2009 | Alharayeri | 455/414.1 |
| 2011/0083111 A1* | 4/2011 | Forutanpour et al. | 715/863 |
| 2011/0163944 A1* | 7/2011 | Bilbrey et al. | 345/156 |
| 2012/0131458 A1* | 5/2012 | Hayes | 715/716 |
| 2013/0185322 A1* | 7/2013 | Vegh | G06Q 10/103 707/769 |

\* cited by examiner

*Primary Examiner* — Tauqir Hussain

(57) ABSTRACT

A system and method for delivering information is disclosed. The system and method includes a first computing device that includes information that is displayed on the screen of the first computing device, the first computing device scanning for a connection point and prompting for selection of a plurality of second devices to receive the information, wherein once ones of the plurality of second devices are selected, a user initiates the delivery of the information from the first computing device to the selected ones of the plurality of second devices by interacting with the first computing device. A user initiates with a flick across the screen of the first computing device. The information may be a business card.

17 Claims, 14 Drawing Sheets

METHOD AND APPARATUS FOR IMPLEMENTING A BUSINESS CARD APPLICATION

CROSS REFERENCE TO RELATED APPLICATIONS

This application claims the benefit of U.S. provisional application No. 61/603,692 filed Feb. 27, 2012, which is incorporated by reference as if fully set forth.

BACKGROUND

In recent years, tablet computers, smartphones, and similar devices have become very popular. These devices frequently include touch screens, via which users can interact with virtual objects using intuitive gestures.

People, and particularly business people, are constantly on the move and their smartphones, tablet computers, and similar devices provide their constant connection to their respective lives and community. An advantageous device to device exchange of virtual information that may be initiated using a swiping gesture is described herein.

SUMMARY

A system and method for delivering information is disclosed. The system includes a first computing device that includes information that is displayed on the screen of the first computing device, the first computing device scanning for a connection point and prompting for selection of a plurality of second computing devices to receive the information, wherein once ones of the plurality of second devices are selected, a user initiates the delivery of the information from the first computing device to the selected ones of the plurality of second devices by interacting with the first computing device. A user initiates the transfer of information with a flick across the screen of the first computing device. The information may be a business card.

The method of delivering information from a first computing device to an at least one of a plurality of second computing devices includes creating information on the first computing device, scanning for a connection point, selecting at least one of a plurality of second devices to receive the information from the first computing device, selecting information to send from the first computing device to the selected at least one of the plurality of second computing devices, and delivering the information. The method may include adding a signature to the information prior to initiating delivery of the information and notifying at least one of the plurality of second computing devices to the received information.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in mobile applications and other computer games and programs. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The present invention provides a method and apparatus for implementing a business card application. This application may be virtual allowing users to exchange their virtual business cards using their respective computing devices by initiating the exchange using a swiping gesture. This exchange of information may occur when the users are proximate or remote from one another. The application may allow for distributing and storing of virtual business cards. Receivers and senders may be linked by the application, in an application to application fashion, to make a direct exchange. A connection to the application is all that is needed to organize and exchange cards. The application may provide a "whoosh" or sliding sound when sending and/or receiving cards.

The system includes a first computing device that includes information that is displayed on the screen of the first computing device, the first computing device scanning for a connection point and prompting for selection of a plurality of second devices to receive the information, wherein once ones of the plurality of second devices are selected, a user initiates the delivery of the information from the first computing device to the selected ones of the plurality of second devices by interacting with the first computing device. A user initiates the transfer of the information with a flick across the screen of the first computing device. The information is a business card.

The method of delivering information from a first computing device to at least one of a plurality of second computing devices includes creating information on the first computing device, scanning for a connection point, selecting at least one of a plurality of second devices to receive the information from the first computing device, selecting information to send from the first computing device to the selected at least one of the plurality of second computing devices, and delivering the information. The method may include adding a signature to the information prior to initiating delivery of the information and notifying at least one of the plurality of second computing devices to the received information.

Figure 1:
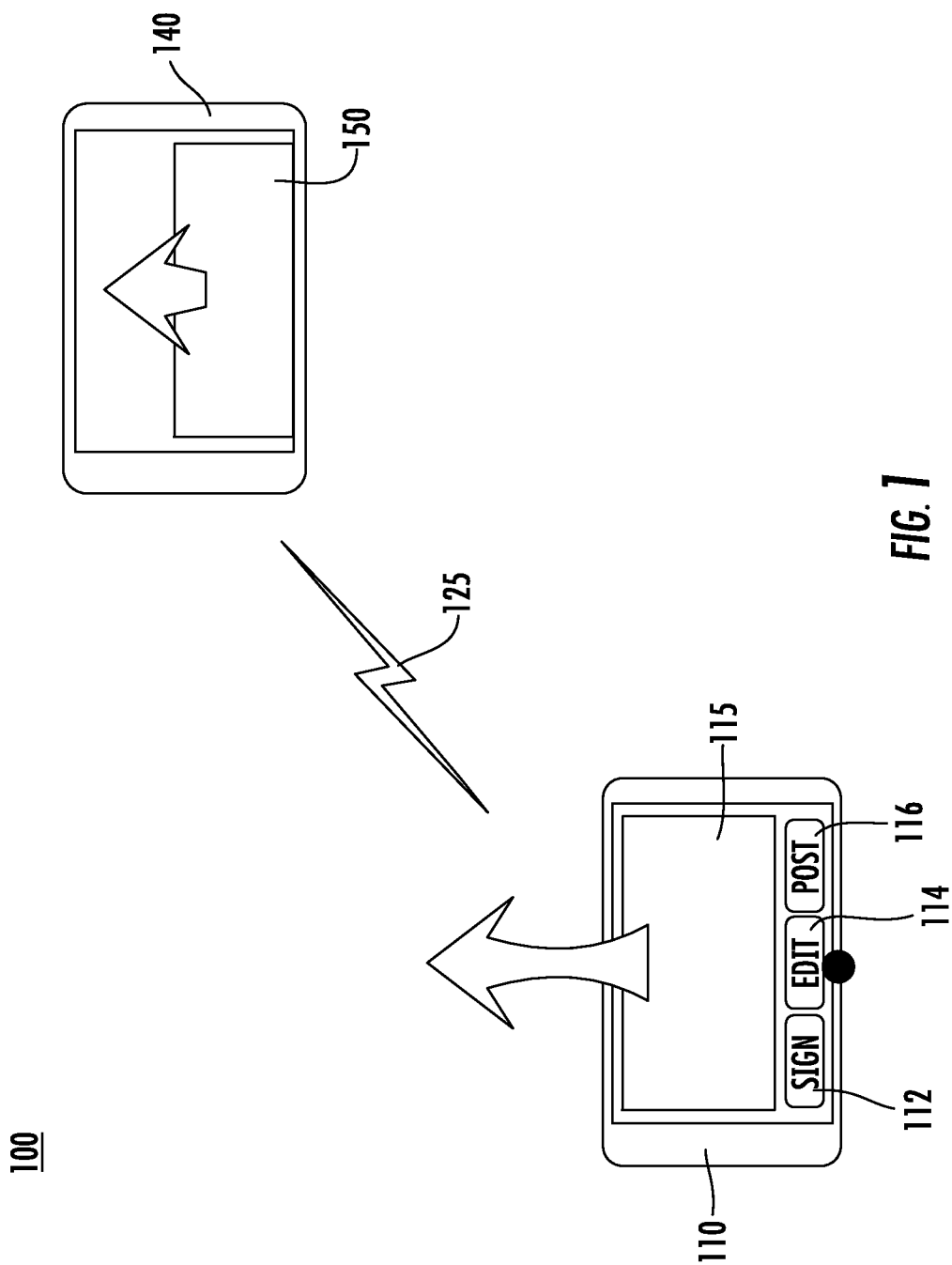
FIG. 1 illustrates a system in which a first computing device delivers a business card to a second computing device.

FIG. 1 illustrates a system 100 in which a first computing device 110 delivers a virtual business card to a second computing device 140. The virtual business card 115 is illustrated on first computing device 110. Business card 115 contains information which may be about the user or owner of first computing device 110. System 100 allows the user of first computing device 110 to deliver business card 115 to second computing device 140. Once business card 115 is received by second computing device 140, business card 115 may take the form of business card 150. Upon receipt, business card 150 may slide onto second computing device 140. This delivery by sliding onto the device may be represented as the business card 150 slides across the screen of the second computing device 140. As similar sliding may occur as the business card 115 departs from the first computing device 110. That is, sending of information from first computing device 110 may appear to slide off of the screen of first computing device 110 and receiving of information at second computing device 140 may provide the appearance that the information is sliding onto the screen of the second computing device 140.

First computing device 110 may be a tablet computer, a television, a projecting display, a display coupled with the stock computer, a display coupled to a laptop computer, or even a portable computing device, such as the Smartphone, for example. Second computing device 140 may be any one of the types of computer devices identified for the first computing device. Generally first and second computing devices 110, 140 may be, for example, a portable computing device that may be hand-held, such as a smart phone or iPhone, and MP3 player having an interactive display or an iPod, or tablet computer or iPad.

In addition, first computing device 110 is depicted as a single computing device with a single display. This is done for ease of description and understanding of the present application.

First computing device 110 may include a depiction of business card 115. A user interface may be provided on the screen which allows a user to interact with the present application. Such interactions include the ability to sign 112 the business card 115, edit 114 the business card 115, and/or post 160 business card 115. Each of sign 112, edit 114, and post 116 may be displayed on first computing device 110 as interactive buttons or widgets to provide a user interface for the user to interact with the present application and select one of sign 112, edit 114, and post 116.

In addition, second computing device 140 is depicted as a single computing device with a single display. This again is done for ease of description and understanding of the present invention. It is expected that the present description may include multiple second computing devices 140, such as for receiving a plurality of business cards 150, including business cards from different users, which users may or may not be in the same location, for example.

For the ease of description, the remainder of the present description will refer to a business card 115, 150, which includes any type of information transferred from one device to another including, but not limited to, the depicted business card. Other types of information that may be transferred may include file types such as Documents (i.e., iWork and Office), PDFs, Audio files, Music, Video files, Movies, Images, Text Files, CSV Files, "Notes", and Links added to core features and photos, data files, applications, by way of non-limiting example only.

The delivering of a business card 115 from first device 110 to second device 140 as business card 150 may occur over a variety of mediums using a multitude of different transmission paths 125. Paths 125 may include wireless and wired connections, direct connections via application to application, emailed transmissions, SMS, MMS, and other data transfer protocols.

Figure 2:
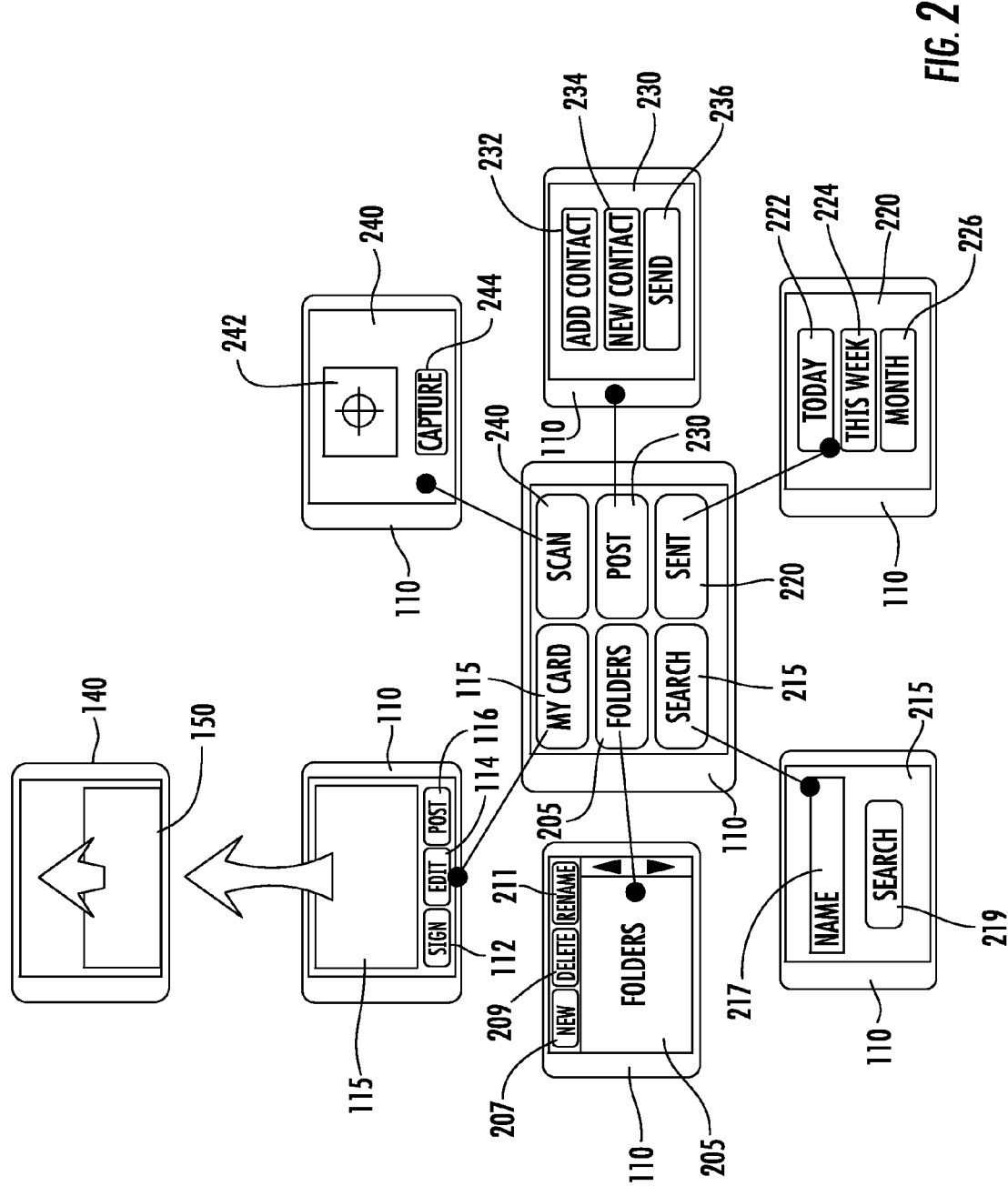
FIG. 2 illustrates a diagram of the system of the present invention.

FIG. 2 illustrates an exploded view of system 100 featuring additional features of the present application. As shown in FIG. 2, system 100 may enable a user to interact with a first computing device 110 in a multitude of different ways. Each of these ways of interacting may be initiated by a user depressing a selection on first computing device 110, or otherwise interacting with first computing device 110. For example, as shown in FIG. 2, computing device 110 may provide a series of buttons that enable progression through a hierarchical menu. As shown in FIG. 2, these buttons may include my card 115, folders 205, search 215, sent 220, post 230, and scan 240. Selection of a given one of these actions navigates the application to the respective sub-action level. Each of these buttons may then launch a user window displayed on first computing device 110.

Interaction with a button such as my card 115 may launch a display on first computing device 110 depicting a user's business card 115 as well as any additional features available for interacting with the business card, including, but not limited to, sign 112, edit 114, and post 160. For example, a user may designate business card 115 for delivery. By activating the "My card" 115 menu, a user may be able to swipe a finger along the display of first computing device 110 or otherwise activate delivery to deliver business card 115 to second computing device 140. Before sending business card 115, a user may add a personal message onto the card such as by activating the sign 112, or edit 114 functions of system 100.

Interaction with a button such as folders 205 may launch a display on first computing device 110 depicting a folders system for storing business cards and information. This display may include the ability for a user to create a new 207 folder, a delete 209 folder, and/or rename 211 a folder. Users may maintain copies of received business cards 150 in folders 205. For example, a user may have a family folder, a technology folder, an investment folder, and the like. A user may create 207 different folders to store received business cards 150 on second computing device 140 with a user's space in the cloud on the application network. In order to navigate through folders 205, a user may activate the "folders" menu 205 of second computing device 140.

Initiating a button such as search 215 may launch a display on first computing device 110 depicting a search screening. This may include a user selectable region 217 that allows a user to enter information on which to base a search. With respect to a business card this may include a person's name, title, phone number, company, e-mail address, website address, or other information included in a business card. By activating "search" 215, system 100 may provide a business search engine allowing users to search for services and business cards of a service. Users may choose to publish pertinent information on the network and allow for other users to locate and identify business cards 115 using the "search" function 215.

Initiating a button such as sent 220 may launch a display on first computing device 110 that enables a user to examine business cards that have been sent in this application. This display may include additional hierarchical buttons that allow a user to examine sent items today 222, this week 224, and this month 226, for example.

Within the send menu 220, system 100 may provide a networking tool. That is, data may be provided regarding circulation of business card 115, by initiating the "sent" menu 220. Upon distribution of business card 115, a user may know, for example, when business card 115 was distributed to second computing device 140 and the parties involved in the distribution, in addition to numerous other statistics. Users may also setup mass distribution, so that business card 115 may be distributed to multiple second computing devices 140 substantially simultaneously. In order to expand the community, users may distribute business card 115 to second computing devices 140 using email distribution. The email may include an image of business card 115, such as in JPG form, for example, and may also include a link to the business card application.

Selecting a button such as post 230 may launch a display on first computing device 110 that enables a user to add contacts 232, provide a new contact 234, and/or send information 236. The display may provide add contacts 232, new contacts 234, and send information 236 using additional hierarchical buttons selectable by a user. By selecting the "post" button 230, a user may be able to provide business card 115 and any associated information as described to the network of host site, described below.

Selecting a button such as scan 240 may launch a display on first computing device 110 that enables a user to scan a business card or other information, such as by using a camera built-in to first computing device 110. A display may be provided at a target 242 included for outlining the business card to be scanned. Once the business card and first computing device 110 are aligned, such that the image of the business card to be scanned is incorporated correctly within target 242, a capture button 244 may be depressed to initiate the scan of the business card.

By using scan button 240, a business card may also include an authoring engine that allows users to build a business card on first computing device 110 by entering information. Within the business card 115 the user can attach information such as official websites and other links, and business information. The "scan" feature 240 of the business card application may be able to capture relevant information from business cards, using Optical Character Recognition (OCR) technology and/or other technology. The user can also auto import the information.

Figure 3:
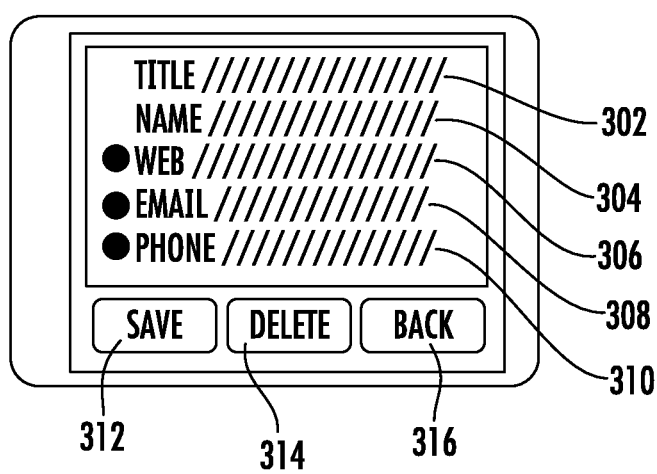
FIG. 3 illustrates a business card utilized within the system.

FIG. 3 illustrates a business card 115 and/or business card 150 utilized within the system 100. This business card may contain a title 302, name 304, web information 306, email address 308 and phone number 310. Additional information may also be included as would be evident to those possessing an ordinary skill in the pertinent arts. The web information 306 may include the ability to guide the first computing device's 110 browser to a certain website. That is, this information may be provided in hyperlink, or the like. Further, the email address 308 may be included, such that activating the email address 308 may use the first computing device 110 to send an email to that respective address. Similarly, the phone number 310 may be provided so that activating the phone number 310 causes the first computing device 110 to attempt to connect to that phone number. Details for particular information may be housed on the front or back of the card, both in a real sense and in the virtual sense in the application. Obviously, a toggle may be created to turn these features off/on as desired. While the present description discusses activating a portion of the business card 115 on first computing device 110, these activations may similarly be achieved on second computing device 140 through the interaction with business card 150.

The application may include an offering engine that allows a user to build a business card 115 on the first computing device 110 using predefined templates. For example, there may be a plurality of templates, such as 5 to 10 templates, to select from that vary in specific fields and position of fields. These templates may provide the ability to add information and attach a photo and/or logo to the business card 115. With the business card 115, the user can attach information such as name of the individual, telephone number, email address, company name and information, and the like. An official website address and other links may be loaded onto the business card 115 from first computing device 110.

Users may export information from the business cards 115, 150 to applications that include contacts. Users may be able to create and delete or share business cards 115, 150. System 100 may include created business cards 115, received business cards 150 and allow business cards 115, 150 to be grouped in the folders and searched.

Figure 4:
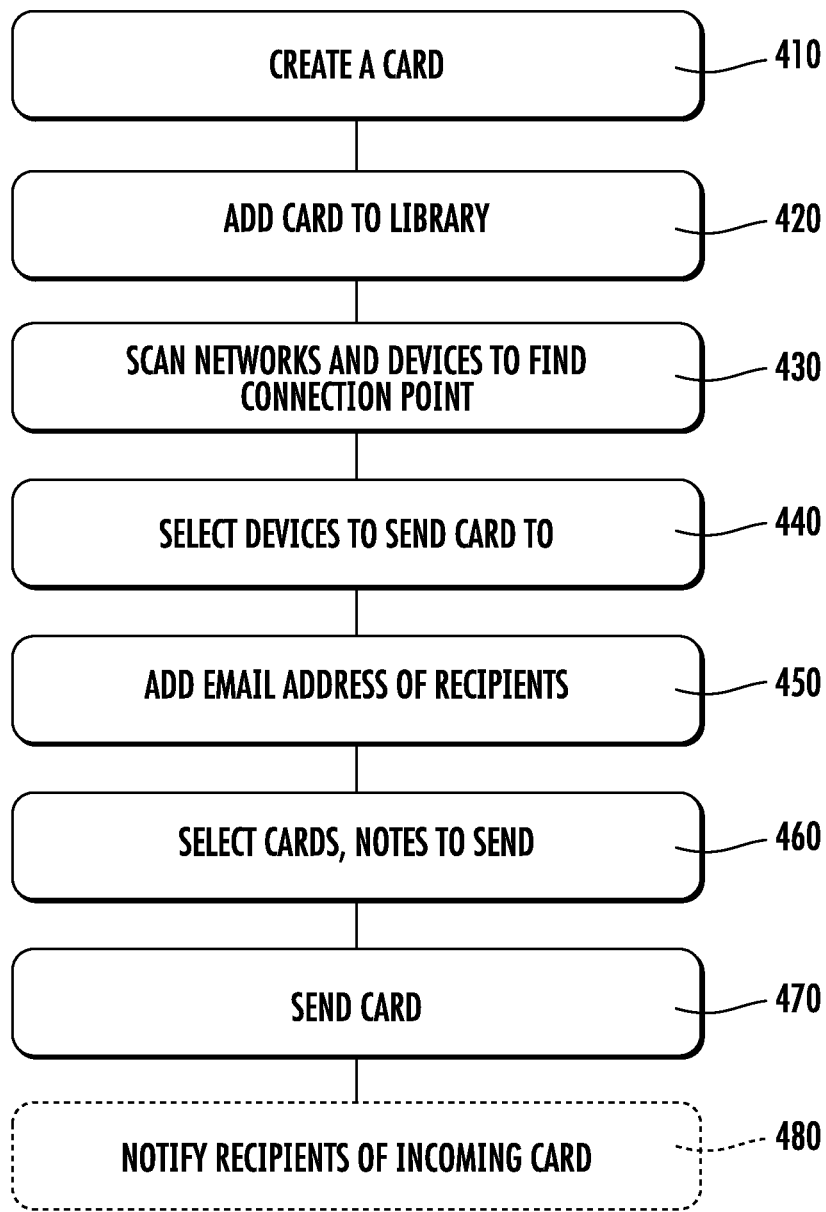
FIG. 4 illustrates the method of providing a business card on the first computing device to a second computing device.

FIG. 4 illustrates the method 400 of providing a business card on the first computing device to a second computing device within system 100. Method 400 includes creating the business card at step 410. The business card 115 may be created as discussed herein above. As discussed above, business card 115 may be categorized in folders. Method 400 includes adding the business card to a library or hierarchical folder system at step 420.

At step 430, method 400 includes scanning networks and devices to find a connection point for the first computing device. At step 440, method 400 selects a device as the second computing device which is to be sent a business card from the first computing device. This selection may be based on the devices located in step 430. Second computing devices 140 that are not located may be delivered the business card 115 via email. Method 400 includes adding e-mail addresses of recipients that cannot be located to be sent the business card 115 directly, and/or those where email delivery may provide a benefit, at step 450.

At step 460, method 400 includes selecting business card(s) and notes or signatures to include in the delivery. Users may preview the selection prior to sending, and the receiving users may be able to preview files and notes prior to saving the received information to the second computing device.

Received information may be provided in an initial storage location such as initially storing in a new "Files" tab, while allowing the sending user via first computing device with the option of connecting to Dropbox, Google Drive, or iCloud or other storage accounts to upload/download files for sharing. The "files" tab may provide an option of previewing files before including the files for sending. Before distributing a business card 115, the user can add a personal message on the business card 115 and users that received business cards 150 may add notes. The message/ notes may not appear on the face of the card although the message/notes may be stored as an attachment that may be viewed by interacting with first or second computing device 110, 140. A link to information may also be included with the delivery.

At step 470, method 400 includes sending the business card and any associated attachment, link or file, as discussed. Method 400 may optionally include notifying recipients of an incoming business card at step 480. This notification may allow a user of second computing device 140 the option of accepting or denying the incoming business card 150.

Figure 5:
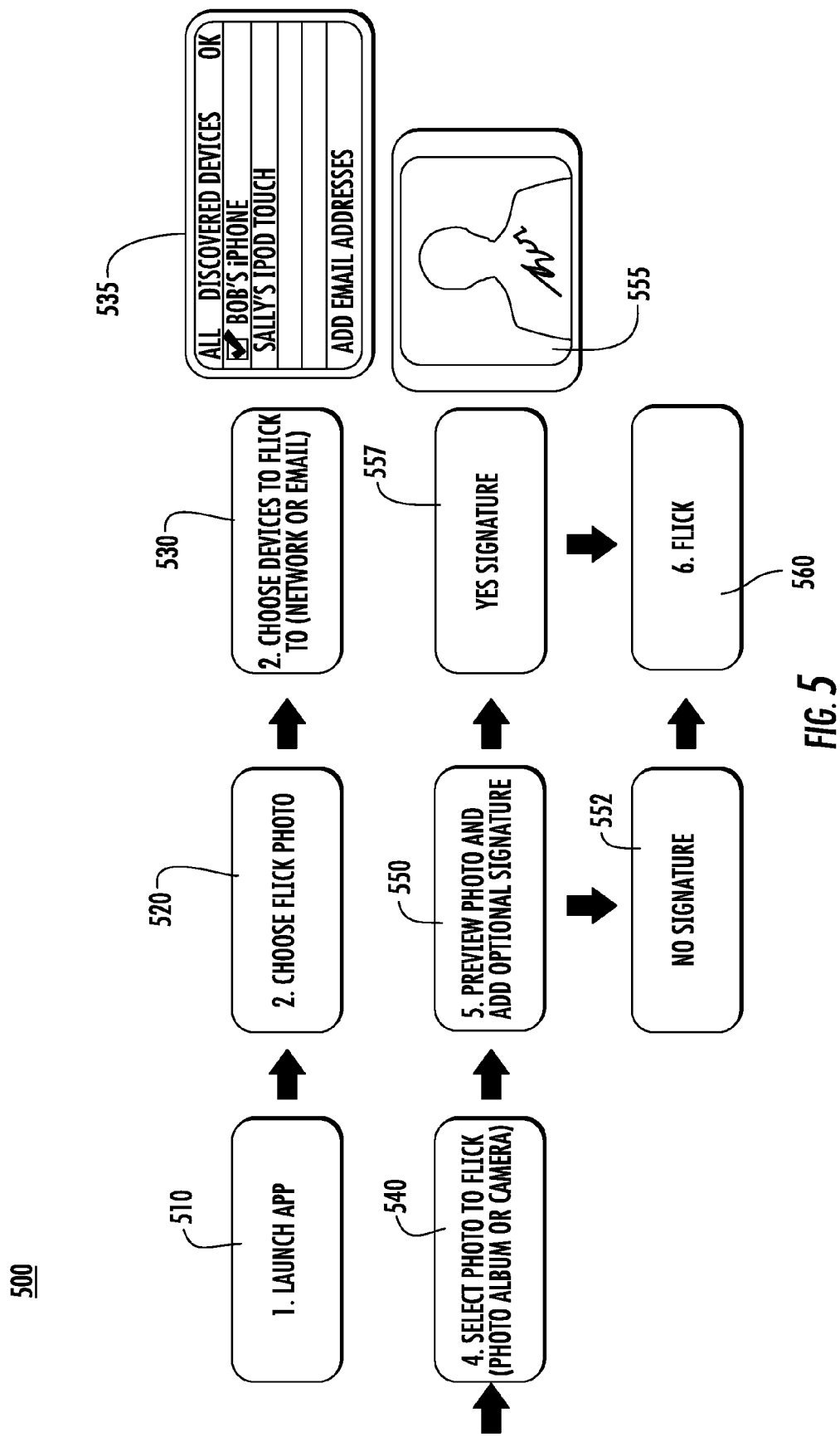
FIG. 5 illustrates a method for providing a photo on the first computing device to a second computing device.

A similar method may be used for sharing a photo. Sharing a photo may provide the option of including a hand-drawn signature. FIG. 5 illustrates a method 500 for providing a photo on the first computing device to a second computing device within system 100. Method 500 includes initiating an application to transfer the photo at step 510. Method 500 includes choosing to transfer the photo at step 520.

At step 530, method 500 includes choosing devices to transfer the photo to such as by over the network or by e-mail. Method 500 may include a display, at step 535, showing all devices that are discovered and that may be selected to receive the sent photo. A user may select devices to send the photo to.

At step 540, method 500 includes selecting the photo to transfer from a photo album or the camera, for example. Method 500 includes previewing the photo and optionally providing a signature on the photo at step 550. Step 550 may branch to "no signature" at step 552 or to "yes signature" at step 557. In the case where a signature is being provided, a display at step 555 may be shown allowing the user to sign the image before sending at step 560.

Method 500 culminates by sending the photo to the designated devices at step 560. The sending may occur via WiFi network, Bluetooth, NIC, or by email, for example, as discussed herein.

Figure 6:
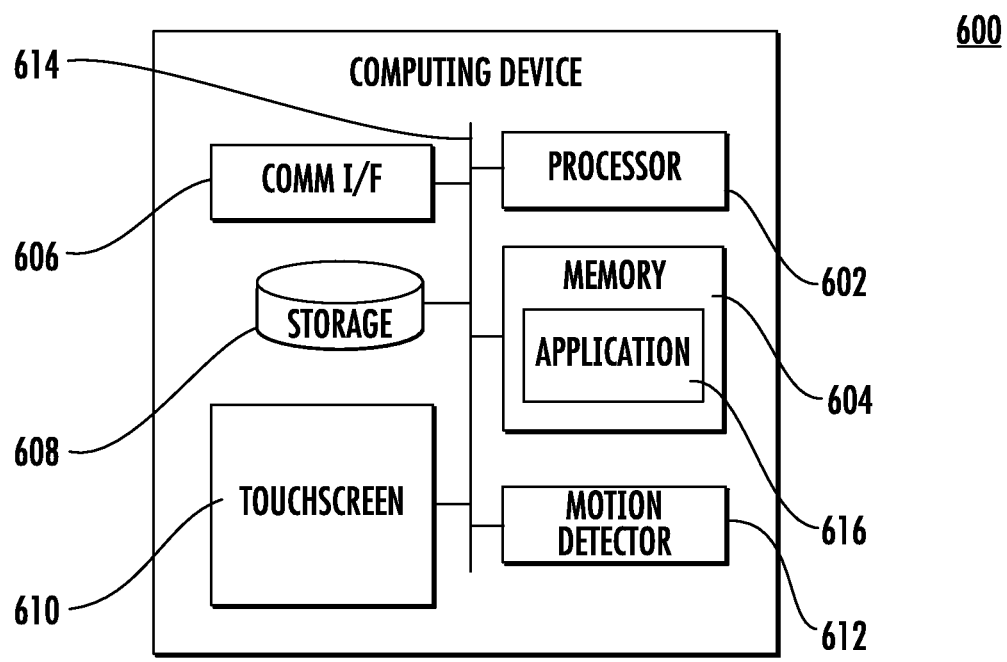
FIG. 6 is a block diagram of the general components of an example computing device, such as the first or second computing device, on which a disclosed application may be executed.

FIG. 6 is a block diagram of a computing device 600 that may be used to implement features described herein. This computing device may be the first computing device 110 and/or the second computing device 140. The computing device 600 includes a processor 602, a memory device 604, a communication interface 606, a data storage device 608, a touchscreen display 610, and a motion detector 612. These components may be connected via a system bus 614 in the computing device 600, and/or via other appropriate interfaces within the computing device 600.

The memory device 604 may be or include a device such as a Dynamic Random Access Memory (D-RAM), Static RAM (S-RAM), or other RAM or a flash memory. As shown in FIG. 6, the application 616 may be loaded into the memory device 604.

The data storage device 608 may be or include a hard disk, a magneto-optical medium, an optical medium such as a CD-ROM, a digital versatile disk (DVDs), or Blu-Ray disc (BD), or other type of device for electronic data storage. The data storage device 608 may store instructions that define the application 616, and/or data that is used by the application 616.

The communication interface 606 may be, for example, a communications port, a wired transceiver, a wireless transceiver, and/or a network card. The communication interface 606 may be capable of communicating using technologies such as Ethernet, fiber optics, microwave, xDSL (Digital Subscriber Line), Wireless Local Area Network (WLAN) technology, wireless cellular technology, and/or any other appropriate technology.

The touchscreen display 610 may be based on one or more technologies such as resistive touchscreen technology, surface acoustic wave technology, surface capacitive technology, projected capacitive technology, and/or any other appropriate touchscreen technology.

The motion detector 612 may include one or more three-axes acceleration motion detectors (e.g., accelerometers) operative to detect linear acceleration in three directions (i.e., the X (left/right) direction, the Y (up/down) direction, and the Z (out of plane) direction). Alternatively, the motion detector 612 can include one or more two-axis acceleration motion detectors 612 which can be operative to detect linear acceleration only along each of the X or Y directions, or any other pair of directions. Alternatively or additionally, the motion detector 612 may be or include an electrostatic capacitance accelerometer that is based on a technology such as silicon micro-machined MEMS (Micro Electro Mechanical Systems) technology, a piezoelectric type accelerometer, a piezoresistance type accelerometer, or any other suitable type of accelerometer.

When the touchscreen 610 receives data that indicates user input, the touchscreen 610 may provide the data to the application 616. Alternatively or additionally, when the motion detector 612 detects motion, the motion detector 612 may provide the corresponding motion information to the application 616.

As shown in FIG. 6, the application 616 is loaded into the memory device 604. Although actions are described herein as being performed by the application 616, this is done for ease of description and it should be understood that these actions are actually performed by the processor 602 (in conjunction with the persistent storage device, network interface, memory, and/or peripheral device interface) in the computing device 600, according to instructions defined in the application 616. Alternatively or additionally, the memory device 604 and/or the data storage device 608 in the computing device 600 may store instructions which, when executed by the processor 602, cause the processor 602 to perform any feature or any combination of features described above as performed by the application 616. Alternatively or additionally, the memory device 604 and/or the data storage device 608 in the computing device 600 may store instructions which, when executed by the processor 602, cause the processor 602 to perform (in conjunction with the memory device, communication interface, data storage device, touchscreen display, and/or motion detector) any feature or any combination of features described above as performed by the application 616.

The computing device 600 shown in FIG. 6 may be, for example, an Apple iPad, or any other appropriate computing device. The application 616 may run on an operating system such as iOS, Android, Linux, Windows, and/or any other appropriate operating system.

Figure 7:
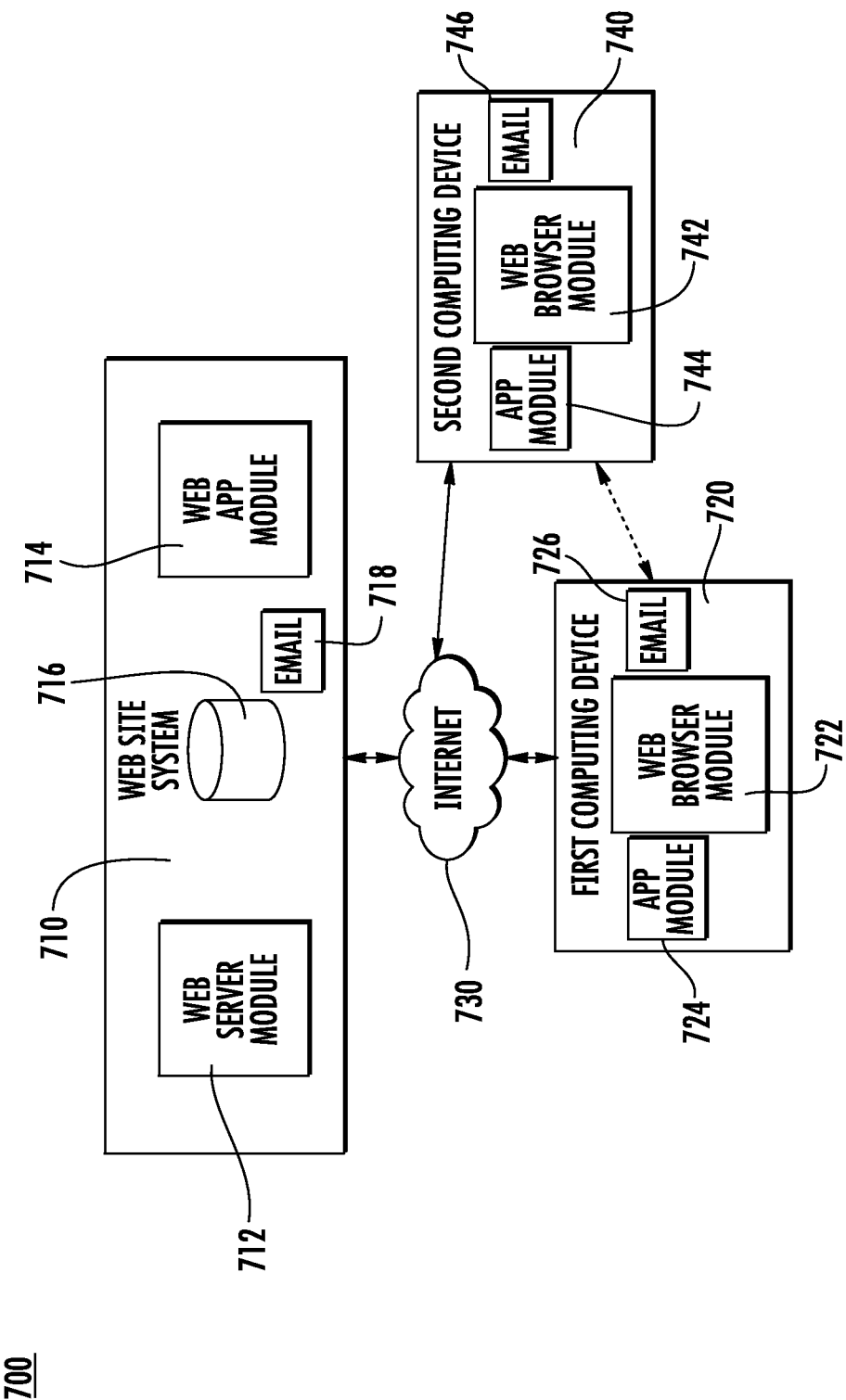
FIG. 7 illustrates an example system architecture wherein features described herein may be implemented.

FIG. 7 shows an example architecture 700 wherein features described herein may be implemented. The example architecture 700 includes a web site system 710, a first computing device 720, the Internet 730, and the second computing device 740. The web site system 710 of FIG. 7 includes hardware (such as one or more server computers) and software for implementing an application as described. The first computing device 720 described above may be used to download and run a local application to interact with other applications and/or software to allow the transfer of information. Alternatively, an end user may use the first computing device 720 to display and interact with the web pages that make up the interactive web site. The device 720 shown in FIG. 7 may be, for example, a laptop or desktop computer, a tablet computer, a smartphone, a PDA, and/or any other appropriate type of device.

The web site system 710 includes a web server module 712, a web application module 714, a database 716, and an email system 718, which, in combination, store and process data for providing the web site. The web application module 714 may provide the logic behind the web site provided by the web site system 710, and/or perform functionality related to the generation of the web pages provided by the web site system 710. The web application 714 may communicate with the web server module 712 for generating and serving the web pages that make up the web site.

Email system 718 may provide an alternative delivery path for the business cards and other information sent as described. This email system may include any methodology of exchanging digital messages from an author to one or more recipients and may exchange information between sender and receiver(s) using Simple Mail Transfer Protocol (SMTP), for example. This may include instant messaging and store and forward models of email systems. Email system 718 may include a server, such as a MAPI, IMAP, POP3, and/or web-based email server, that operates as a connection between sender and receiver(s). Email system 718 may connect to emails systems 726, 746.

The first computing device 720 may include a web browser module 722, which may receive, display, and interact with the web pages provided by the web site system 710. The web browser module 722 in the first computing device 720 may be, for example, a web browser program such as Internet Explorer, Firefox, Opera, Safari, and/or any other appropriate web browser program. To provide the web site to the user of the first computing device 720, the web browser module 722 in the first computing device 720 and the web server module 712 may exchange HyperText Transfer Protocol (HTTP) messages, per current approaches that would be familiar to a skilled person.

The application module 724 may provide the logic behind the second computing device and interaction provided by the web browser module 722, and/or performs functionality related to the generation of the web pages provided by the web browser module 722. The application module 724 may communicate with the web browser module 722 for generating and serving the web pages that make up the web site.

Email system 726 may provide an alternative delivery path for the business cards and other information sent as described. This email system may include any methodology of exchanging digital messages from an author to one or more recipients. This may include instant messaging and store and forward models of email systems. Email system 726 may include a server that operates as a connection between sender and receiver(s). Email system 726 may connect to emails systems 718, 746.

The second computing device 740 may include a web browser module 742, which may receive, display, and interact with the web pages provided by the web site system 710. The web browser module 742 in the second computing device 740 may be, for example, a web browser program such as Internet Explorer, Firefox, Opera, Safari, and/or any other appropriate web browser program. To provide the web site to the user of the second computing device 740, the web browser module 742 in the second computing device 740 and the web server module 712 may exchange HyperText Transfer Protocol (HTTP) messages, per current approaches that would be familiar to skilled person.

The application module 744 may provide the logic behind the second computing device and interaction provided by the web browser module 742, and/or performs functionality related to the generation of the web pages provided by the web browser module 742. The application module 744 may communicate with the web browser module 742 for generating and serving the web pages that make up the web site.

Email system 746 may provide an alternative delivery path for the business cards and other information sent as described. This email system may include any methodology of exchanging digital messages from an author to one or more recipients. This may include instant messaging and store and forward models of email systems. Email system 746 may include a server that operates as a connection between sender and receiver(s). Email system 746 may connect to emails systems 718, 726.

As described hereinabove, details regarding the interactive web site and the pages of the web site (as generated by the web site system 710 and displayed/interacted with by the user of the first computing device 720) are provided.

Registration to the site is required in order to interact using the first computing device 720. Users can create an account with the web site, and/or may log in via credentials associated with other web sites. With each user account, the user has a personal page. Via this page, users can establish "friends" links to other users, transmit/receive messages, and publish their bookmarks. Users can also publish in forums on the site, post comments, and create bookmarks.

The web site may include any number of different web pages, including but not limited to the following: a front (or "landing") page; a search results page; an account landing page; and a screening window page.

Via the account landing page, the user is able to perform actions such as: set options for the user's account; update the user's profile; customize the landing page and/or the account landing page; post information; perform instant messaging/chat with other users who are logged in; view information related to bookmarks the user has added; view information regarding the user's friends/connections; view information related to the user's activities; and/or interact with others and/or software for transferring information.

Advertising may be integrated into the site in any number of different ways. As one example, each or any of the pages in the web site may include banner advertisements. Alternatively, video advertisements may be played, and/or be inserted periodically.

The components in the web site system 710 (web server module 712, web application module 714, email system 718) may be implemented across one or more computing devices (such as, for example, server computers), in any combination.

The database 716 in the web site system 710 may be or include one or more relational databases, one or more hierarchical databases, one or more object-oriented databases, one or more flat files, one or more structured files, and/or one or more other files for storing data in an organized/accessible fashion. The database 716 may be spread across any number of computer-readable storage media. The database 716 may be managed by one or more database management systems in the web site system 710, which may be based on technologies such as Microsoft SQL Server, MySQL, PostgreSQL, Oracle Relational Database Management System (RDBMS), a NoSQL database technology, and/or any other appropriate technologies and/or combinations of appropriate technologies. The database 716 in the web site system 710 may store information related to the web site provided by the web site system 710, including but not limited to any or all information described herein as necessary to provide the features offered by the web site.

The web server module 712 implements the Hypertext Transfer Protocol (HTTP). The web server module 712 may be, for example, an Apache web server, Internet Information Services (IIS) web server, nginx web server, and/or any other appropriate web server program. The web server module 712 may communicate HyperText Markup Language (HTML) pages, handle HTTP requests, handle Simple Object Access Protocol (SOAP) requests (including SOAP requests over HTTP), and/or perform other related functionality.

The web application module 714 may be implemented using technologies such as PHP: Hypertext Preprocessor (PHP), Active Server Pages (ASP), Java Server Pages (JSP), Zend, Python, Zope, Ruby on Rails, Asynchronous JavaScript and XML (Ajax), and/or any other appropriate technology for implementing server-side web application functionality. In various implementations, the web application module 714 may be executed in an application server (not depicted in FIG. 7) in the web site system 710 that interfaces with the web server module 712, and/or may be executed as one or more modules within the web server module 712 or as extensions to the web server module 712. The web pages generated by the web application module 714 (in conjunction with the web server module 712) may be defined using technologies such as HTML (including HTML5), eXtensible HyperText Markup Language (XHMTL), Cascading Style Sheets, Javascript, and/or any other appropriate technology.

Alternatively or additionally, the web site system 710 may include one or more other modules (not depicted) for handling other aspects of the web site provided by the web site system 710.

The web browser module 722 in the first computing device 720 and/or the web browser module 742 in the second computing device 740 may include and/or communicate with one or more sub-modules that perform functionality such as rendering HTML, rendering raster and/or vector graphics, executing JavaScript, decoding and rendering video data, and/or other functionality. Alternatively or additionally, the web browser module 722, 742 may implement Rich Internet Application (RIA) and/or multimedia technologies such as Adobe Flash, Microsoft Silverlight, and/or other technologies, for displaying video. The web browser module 722, 742 may implement RIA and/or multimedia technologies using one or web browser plug-in modules (such as, for example, an Adobe Flash or Microsoft Silverlight plugin), and/or using one or more sub-modules within the web browser module 722, 742 itself. The web browser module 722, 742 may display data on one or more display devices (not depicted) that are included in or connected to the first computing device 720 and/or second computing device 740, such as a liquid crystal display (LCD) display or monitor. The first computing device 720 may receive input from the user of the first computing device 720 from input devices (not depicted) that are included in or connected to the first computing device 720, such as a keyboard, a mouse, or a touch screen, and provide data that indicates the input to the web browser module 722. The second computing device 740 may receive input from the user of the second computing device 740 from input devices (not depicted) that are included in or connected to the second computing device 720, such as a keyboard, a mouse, or a touch screen, and provide data that indicates the input to the web browser module 742.

As depicted in FIG. 7, the first computing device 720 and the second computing device 740 may be interconnected such as by infrared signal, NIC, Bluetooth or other direct communication methods.

Although the example architecture of FIG. 7 shows two computing devices, this is done for convenience in description, and it should be understood that the architecture of FIG. 7 in may include, mutatis mutandis, any number of computing devices with the same or similar characteristics as the described computing devices.

Although the methods and features are described herein with reference to the example architecture of FIG. 7, the methods and features described herein may be performed, mutatis mutandis, using any appropriate architecture and/or computing environment. Alternatively or additionally, although examples are provided herein in terms of web pages generated by the web site system 710, it should be understood that the features described herein may also be implemented using specific-purpose client/server applications. For example, each or any of the features described herein with respect to the web pages in the interactive web site may be provided in one or more specific-purpose applications. For example, the features described herein may be implemented in mobile applications for Apple iOS, Android, or Windows Mobile platforms, and/or in client application for Windows, Linux, or other platforms, and/or any other appropriate computing platform.

For convenience in description, the modules (web server module 712, web application module 714, web browser module 722 and email system 718) shown in FIG. 7 are described herein as performing various actions. However, it should be understood that the actions described herein as performed by these modules are in actuality performed by hardware/circuitry (i.e., processors, network interfaces, memory devices, data storage devices, input devices, and/or display devices) in the electronic devices where the modules are stored/executed.

Figure 8:
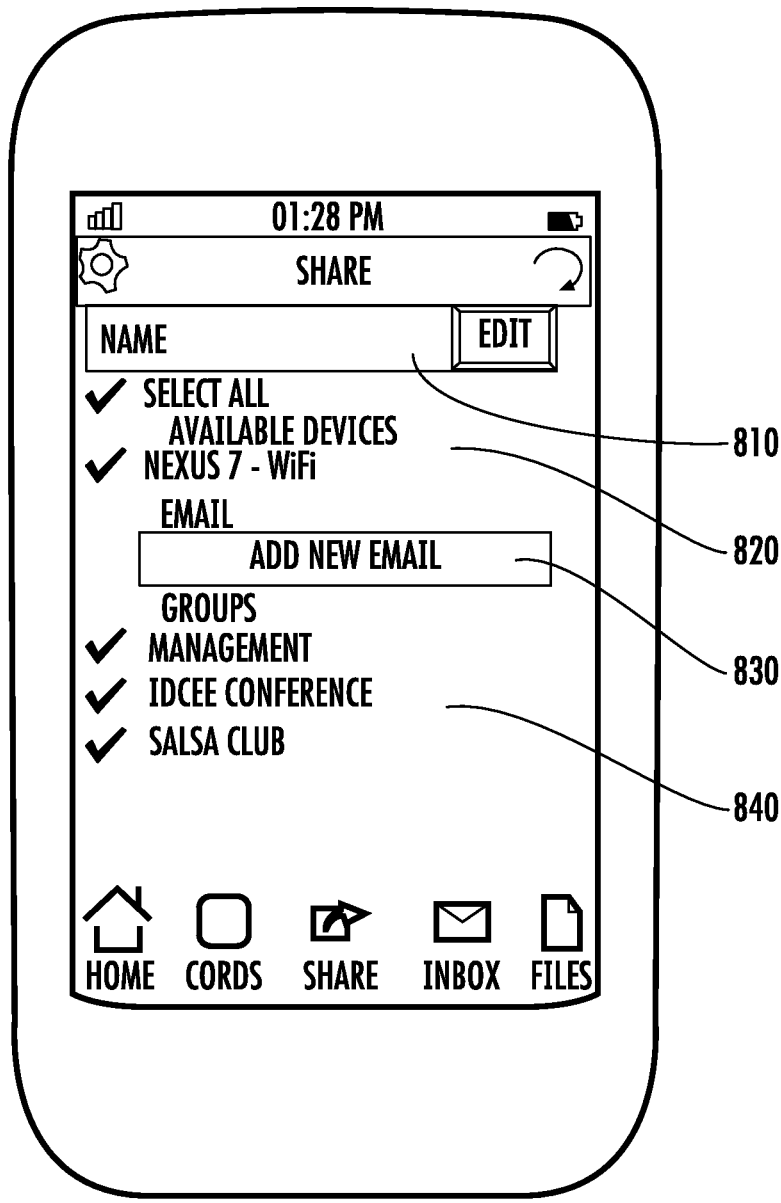
FIG. 8 illustrates a screen depiction of the disclosed application depicting the "share" screen.

FIG. 8 illustrates a screen depiction 800 of the present application showing a picture of the "share" screen. In this screen 800, a user may search for a particular individual by inputting a name 810 or other information, may select all available devices 820 or ones of the available devices, may connect through WiFi to particular devices and/or add e-mail addresses of contacts 830. Additionally, groups 840 may be created. In FIG. 8, groups 840 are depicted as management, International conference Investor Day in Central and Eastern Europe (IDCEE), and salsa club. Each of these groups 840 may contain individual contact information via WiFi, by e-mail or other connection to allow to sending information to the entities associated with the group as a whole.

Figure 9:
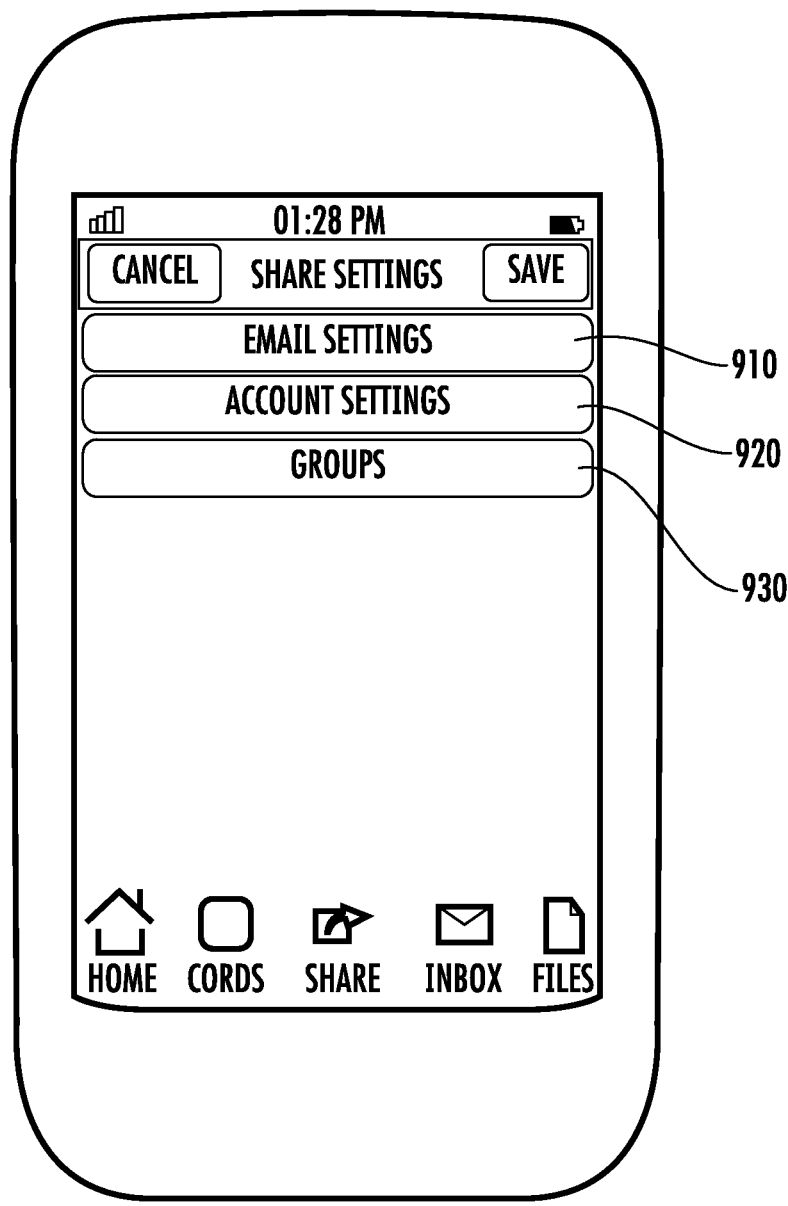
FIG. 9 illustrates a screen depiction of the disclosed application showing share settings that may be configured.

FIG. 9 illustrates a screen depiction 900 of the present application showing share settings that may be configured including e-mail settings 910, account settings 920, and group settings 930.

Figure 10:
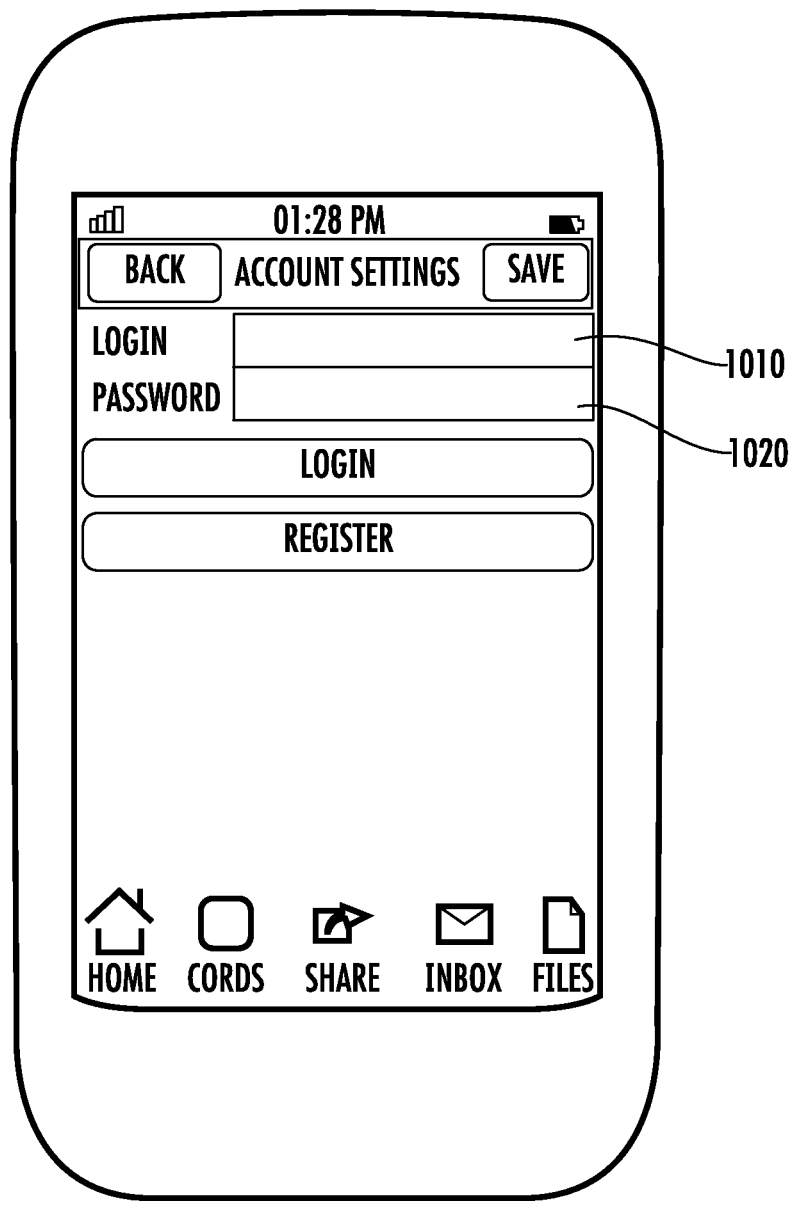
FIG. 10 illustrates a screen depiction of a prompt to login.

FIG. 10 illustrates a screen depiction 1000 of the account settings of FIG. 9 wherein a user may be prompted the login with a login 101 and password 1020 and register the respective device.

Figure 11:
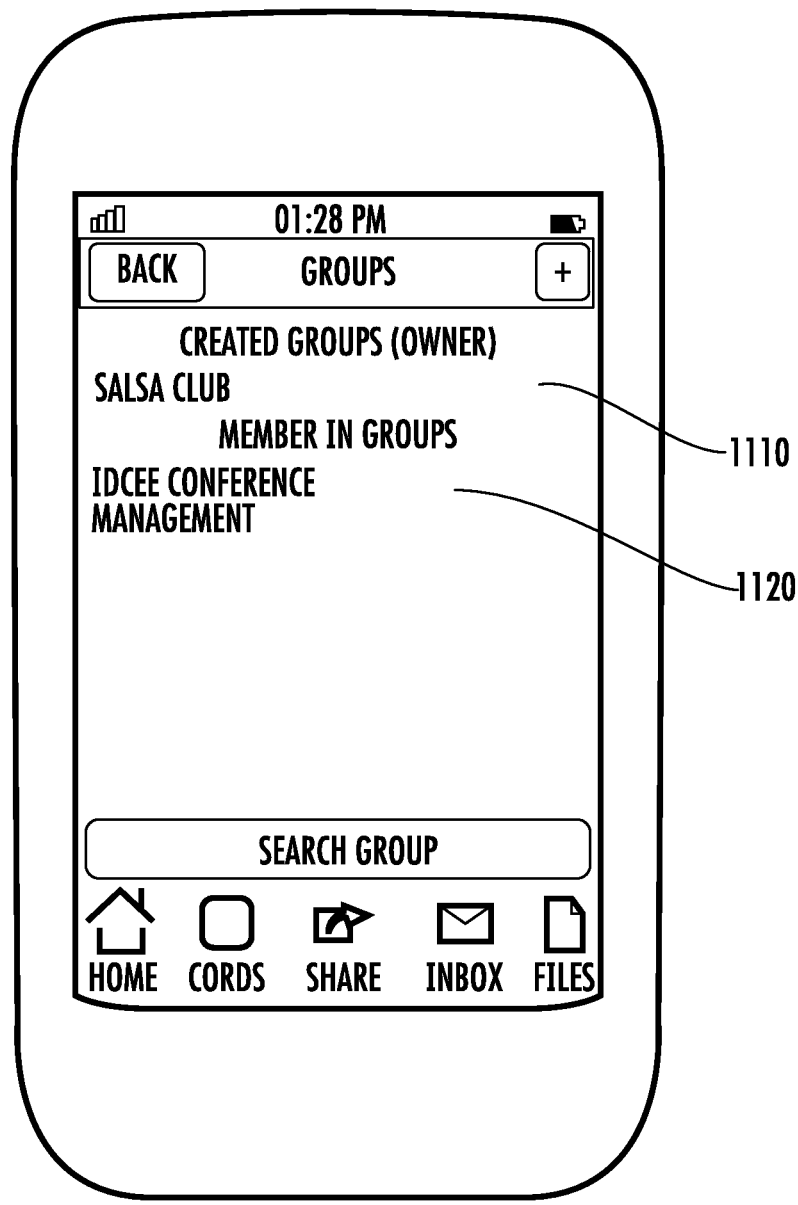
FIG. 11 illustrates a screen depicting a group creation screen and assigning members to groups.

FIG. 11 illustrates a screen depiction 1100 of the group settings of FIG. 9 wherein a user may create groups 1110 and assign members to groups 1120. Groups may also be searched for specific individuals. Also individuals may be created and configured in multiple groups.

Figure 12:
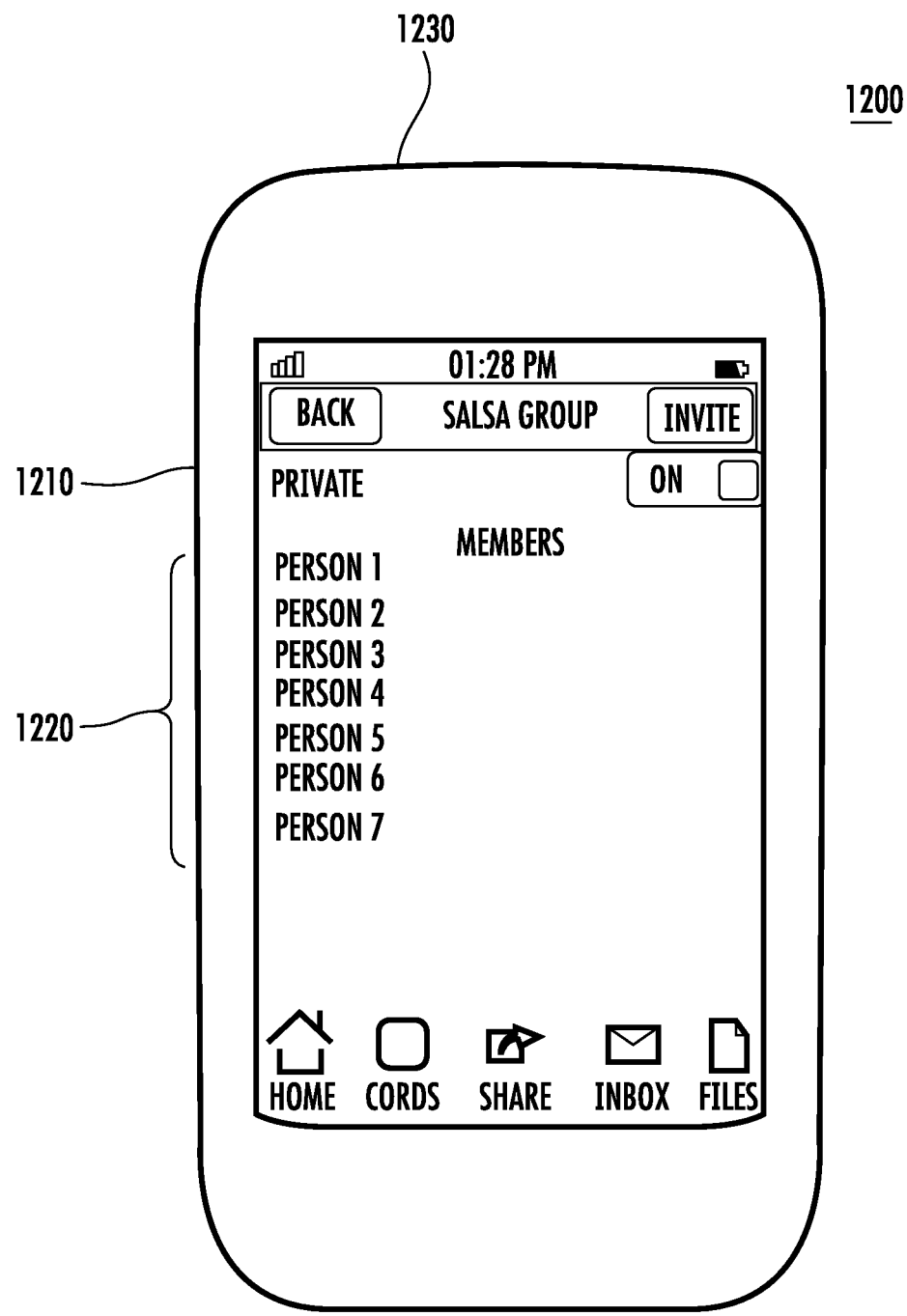
FIG. 12 illustrates a screen depiction of a group setting for an exemplary salsa group.

FIG. 12 illustrates a screen depiction 1200 of a group setting any exemplary salsa group 1230. The salsa group 1230 may include a number of members 1220 identified as person 1-7, each having particular contact information. The group may have a setting such as private or public 1210.

Figure 13:
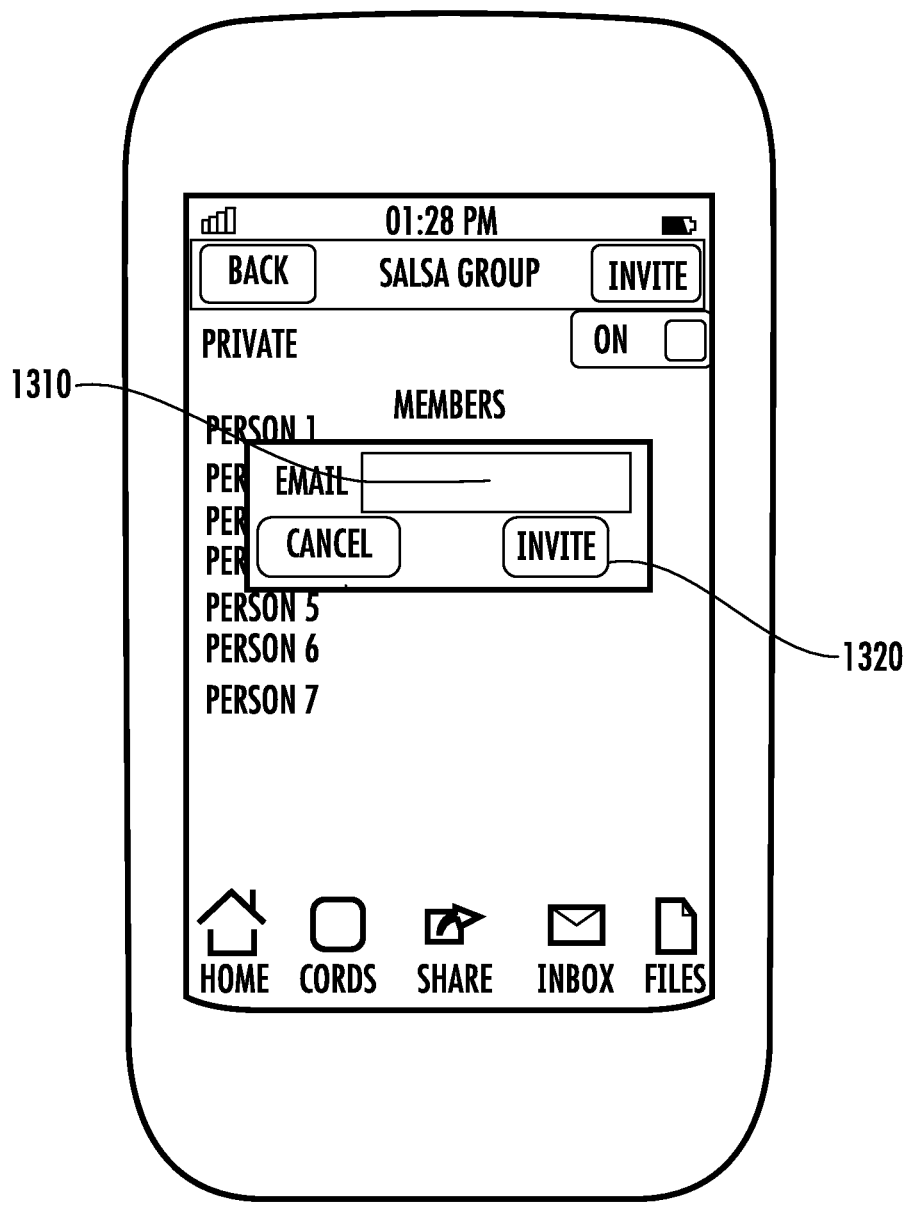
FIG. 13 illustrates a screen depicting the addition of a member to the exemplary salsa group.

FIG. 13 illustrates a screen depiction 1300 of the addition of a member to the exemplary salsa group by entering contact information such as e-mail 1310 for the member. Once entered, an invitation 1320 may be sent to the new member in this user may be added to the group. The group may be updated seamlessly throughout the contacts of all group members or updated solely on the respective device of a user who as invited group member.

Figure 14:
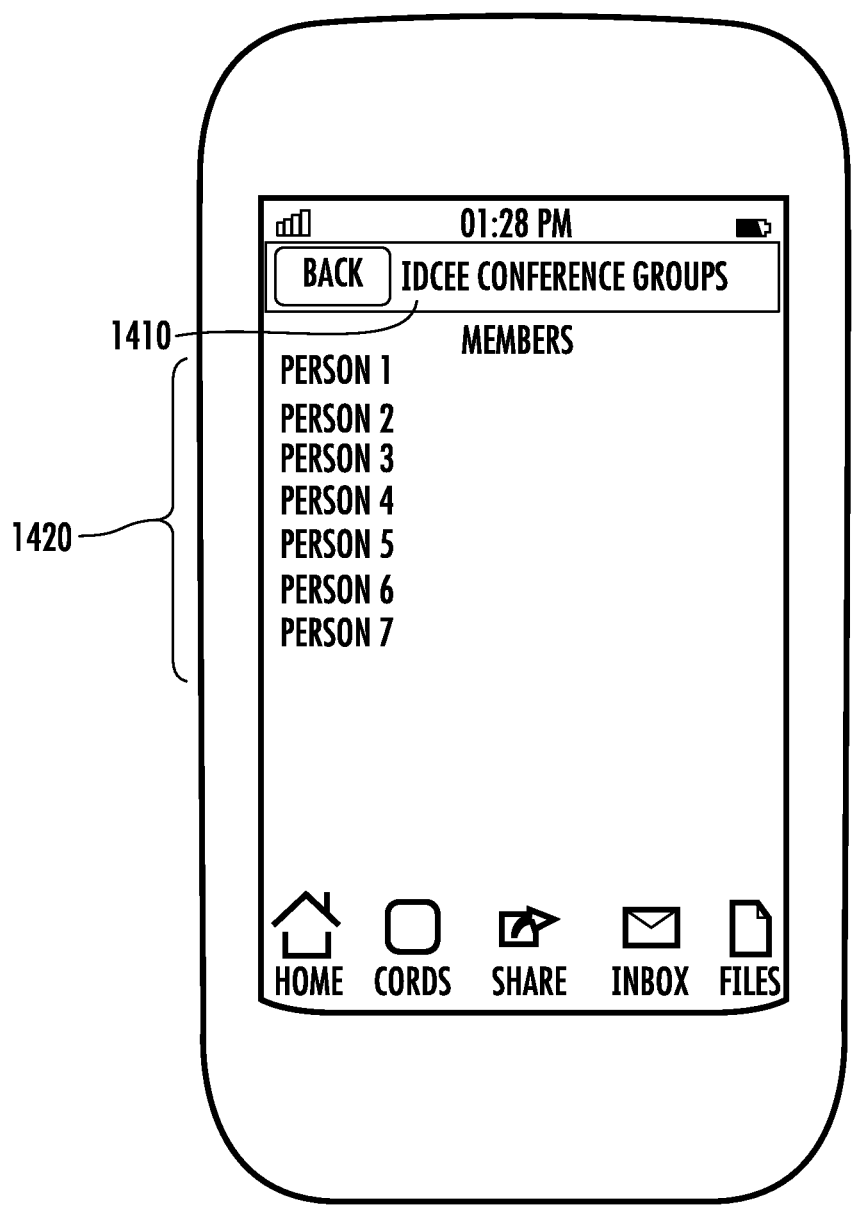
FIG. 14 illustrates a screen depiction of group settings of an exemplary International conference Investor Day in Central and Eastern Europe (IDCEE) group.

FIG. 14 illustrates a screen depiction 1400 of a group setting of an exemplary IDCEE group 1410. The IDCEE group 1410 may include a number of members 1420 identified as person 1-7, each having particular contact information.

As used herein, the term "processor" broadly refers to and is not limited to a single- or multi-core central processing unit (CPU), a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features are described herein as being performed in a tablet computing device, the features described herein may also be implemented, mutatis mutandis, on a desktop computer, a laptop computer, a netbook, a cellular phone, a personal digital assistant (PDA), or any other appropriate type of tablet computing device or data processing device.

Although features and elements are described above in particular combinations, each feature or element can be used alone or in any combination with or without the other features and elements. For example, each feature or element as described above may be used alone without the other features and elements or in various combinations with or without other features and elements. Sub-elements of the methods and features described above may be performed in any arbitrary order (including concurrently), in any combination or sub-combination.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

What is claimed is:

1. A system for delivering information, the system comprising:
   a first computing device that includes a virtual business card that is displayed on the screen of the first computing device, wherein the first computing device is connected with a wireless network, the first computing device scanning for a connection point and on a condition that the connection point is found, identifying a plurality of second devices to receive the information, wherein the plurality of second devices are connected with the wireless network, prompting for selection of the plurality of second devices to receive the information, wherein at least one of the plurality of second devices is selected, a user generates a personal message and initiates the delivery of the virtual business card and the personal message from the first computing device to the selected at least one of the plurality of second devices by interacting with the first computing device, wherein during delivery the virtual business card slides off of the screen of the first computing device; wherein at least one of the second computing devices categorizes the virtual business card information upon delivery; and wherein at least one of the second computing devices receives notification of received virtual business card.

2. The system of claim 1 wherein the user initiates with a flick across the screen of the first computing device.

3. The system of claim 1 wherein the delivery occurs directly from the first computing device to the second computing device.

4. The system of claim 1 wherein the delivery occurs via email.

5. The system of claim 1 wherein the virtual business card includes at least one of name, title, phone number, and email.

6. The system of claim 1 wherein the user, prior to initiating delivery of the virtual business card, adds a signature to the virtual business card.

7. A method of delivering information from a first computing device to at least one of a plurality of second computing devices, the method comprising:
   creating virtual business card on the first computing device and storing the created virtual business card in memory on the first computing device; wherein the first computing device is connected with a wireless network;
   scanning, by a processor on the first computing device, for at least one connection point for the first computing device;
   on a condition that the connection point is found, identifying a plurality of second devices to receive the information; wherein the plurality of second devices are connected with the wireless network;
   using a communication interface and display to provide the plurality of second devices and allowing a user to select at least one of a plurality of second devices to receive the virtual business card from the first computing device;
   selecting virtual business card to send from the first computing device to the selected at least one of the plurality of second computing devices;
   generating a personal message to include with the virtual business card;
   delivering the virtual business card and the personal message upon initiation via the communication interface;
   categorizing the virtual business card information upon delivery to the at least one of the second computing devices; and
   notifying at least one of the second computing devices of received virtual business card.

8. The method of claim 7 wherein creating the virtual business card includes accessing the virtual business card.

9. The method of claim 7 wherein the delivering of the virtual business card is initiated by a user.

10. The method of claim 9 wherein the initiation is by a flick across the screen of the first computing device.

11. The method of claim 7 wherein the delivering occurs directly from the first computing device to at least one of the plurality of second computing device.

12. The method of claim 7 wherein the delivering occurs via email.

13. The method of claim 7 wherein the virtual business card includes at least one of name, title, phone number, and email.

14. The method of claim 7 further comprising adding a signature to the virtual business card prior to initiating delivery of the virtual business card.

15. A non-transitory computer-readable medium having processor-executable instructions stored thereon which, when executed by at least one processor, will cause the at least one processor to perform a method of delivering information from a first computing device to at least one of a plurality of second computing devices, the method comprising:
- creating virtual business card on the first computing device and storing the created virtual business card in memory on the first computing device; wherein the first computing device is connected with a wireless network;
- scanning, by a processor on the first computing device, for at least one connection point for the first computing device;
- on a condition that the connection point is found, identifying a plurality of second devices to receive the information; wherein the plurality of second devices are connected with the wireless network;
- using a communication interface and display to provide the plurality of second devices and allowing a user to select at least one of a plurality of second devices to receive the information virtual business card from the first computing device;
- selecting virtual business card to send from the first computing device to the selected at least one of the plurality of second computing devices;
- generating a personal message to include with the virtual business card;
- delivering the virtual business card and the personal message upon initiation via the communication interface;
- categorizing the virtual business card information upon delivery to the at least one of the second computing devices; and
- notifying at least one of the second computing devices of received virtual business card.

16. A system for delivering information, the system comprising:
- a first computing device that includes a virtual business card displayed on the screen of the first computing device, wherein the first computing device is connected with a wireless network, the first computing device scanning for a connection point and prompting for selection of a plurality of second devices to receive the virtual business card, wherein the plurality of second devices are connected with the wireless network, wherein at least one of the plurality of second devices is selected and each of the selected plurality of second devices has generated therefor a personal message, a user initiates the delivery of the virtual business card and the personal message from the first computing device to the selected at least one of the plurality of second devices by flicking the virtual business card from the display of the first computing device, wherein during delivery the virtual business card slides off of the screen of the first computing device, to the selected second devices; wherein at least one of the second computing devices categorizes the virtual business card information upon delivery; and wherein at least one of the second computing devices receives notification of received virtual business card.

17. A method of delivering information from a first computing device to at least one of a plurality of second computing devices, the method comprising:
- creating virtual business card on the first computing device and storing the created virtual business card in memory on the first computing device; wherein the first computing device is connected with a wireless network;
- scanning, by a processor on the first computing device, for at least one connection point for the first computing device;
- using a communication interface and display to provide a plurality of second devices and allowing a user to select at least one of a plurality of second devices to receive the virtual business card from the first computing device; wherein the plurality of second devices are connected with the wireless network;
- selecting virtual business card to send from the first computing device to the selected at least one of the plurality of second computing devices;
- delivering, based on initiation by a user, the virtual business card upon initiation via the communication interface;
- adding a signature and personal message to the virtual business card prior to initiating delivery of the information;
- categorizing the virtual business card information upon delivery to the at least one of the second computing devices; and
- notifying at least one of the plurality of second computing devices to the received virtual business card.

* * * * *